United States Patent Office 2,886,595
Patented May 12, 1959

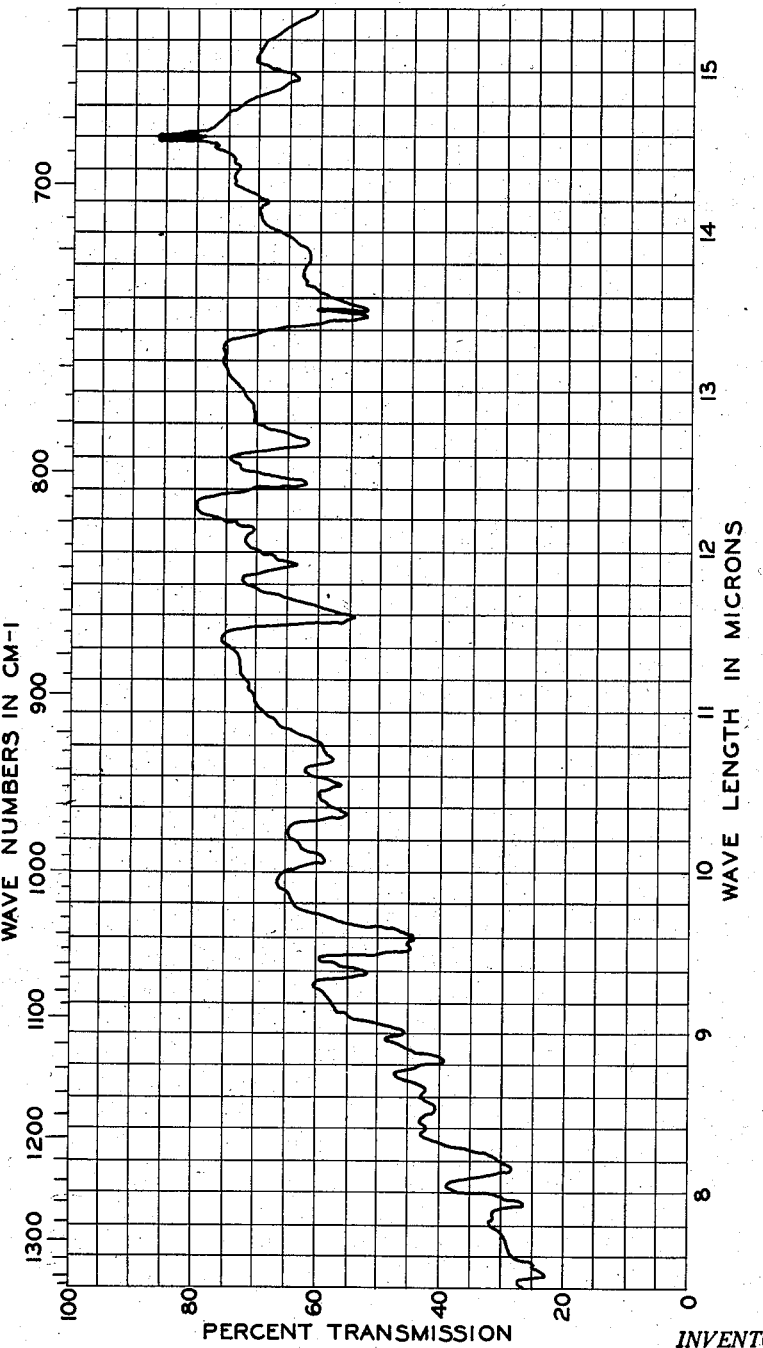

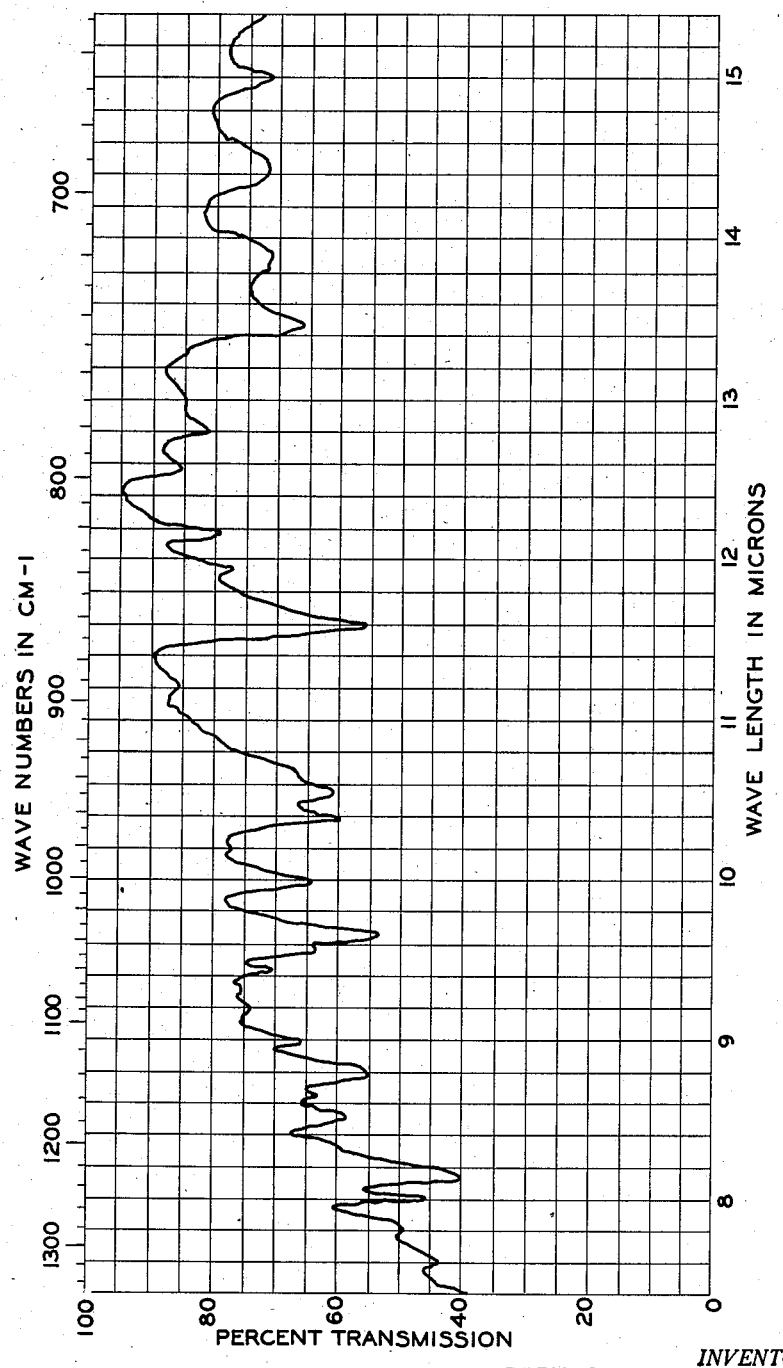

2,886,595

TETRACYCLINE RECOVERY

Bernard Heinemann, De Witt, and Irving R. Hooper, Fayetteville, N.Y., assignors to Bristol Laboratories Inc., East Syracuse, N.Y., a corporation of New York Application September 30, 1958, Serial No. 764,284

2 Claims. (Cl. 260—559)

This invention is concerned with novel and useful methods for the production of an antibiotic we have called Omegamycin, and which is now more commonly called tetracycline. More particularly, it relates to particular methods for its recovery and concentration from crude solutions including the fermentation broths and purification thereof.

This appliaction is a continuation-in-part of our prior copending application Serial Number 432,388, filed May 26, 1954, now abandoned, which was in turn a continuation-in-part of prior copending applications Serial Numbers 388,048, filed October 19, 1953 and now abandoned, 404,380, filed January 15, 1954, and now abandoned, and 406,062, filed January 25, 1954 and now abandoned.

During the past few years a number of metabolic products of the growth of bacteria and fungi have been isolated and found to possess valuable therapeutic properties. Among these may be mentioned penicillin, streptomycin, gramicidin, tyrocidin, bacitracin, subtilin, streptothricin, Aureomycin (chlortetracycline), Terramycin (oxytetracycline) and others. Some of these have proven to be extremely valuable because of their effectiveness against pathogenic organisms. Others have been found to be of limited usefulness for various reasons, as because of their toxicity. Chlortetracycline, oxytetracycline and tetracycline have been particularly useful because of their broad spectrum of activity. Of these, tetracycline is an antibiotic of broad spectrum which gives better blood levels and fewer side reactions than chlortetracycline and oxytetracycline and in particular is more stable than chlortetracycline in alkaline media.

The object of the present invention is to provide improved methods of preparing tetracycline which are suitable for commercial use.

In accordance with the present invention there is provided a process for recovering tetracycline from a fermentation broth comprising the consecutive steps of adjusting the pH of an acidic fermentation broth to a pH in the range of 8.5 to 9.4 inclusive, extracting the tetracycline with n-butanol, separating the n-butanol and recovering the tetracycline therefrom.

The tetracycline produced by the process of the present invention is an amphoteric substance effective in inhibiting the growth of Gram-positive and Gram-negative bacteria and capable of forming salts with acids and metals, whose anhydrous base has the empirical formula $C_{22}H_{24}N_2O_8$, m elts substantially at 170°–173° C. with decomposition, has $[\alpha]_D^{27}$— 245° at a concentration of 1% in methanol, has ultra-violet absorption peaks at 267 m$\mu$ ($\epsilon$, 17, 400) and 355 m$\mu$ ($\epsilon$, 13, 500) in 0.1 N hydrochloric acid and exhibits when suspended in mineral oil characteristic absorption in the infrared region of the spectrum at the following frequencies expressed in reciprocal centimeters: 3490, 1672, 1607, 1524, 1259, 1222, 1130, 1065, 1040, 990, 963, 948, 932, 861, 838, 803, 786, 741, 739, and 668; its hydrochloride melts substantially at 217–219° C. with decomposition, has the empirical formula $C_{22}H_{24}N_2O_8 \cdot HCl$, has $[\alpha]_D^{27}$—253° at a concentration of 0.5% in 0.1 N hydrochloric acid and exhibits when suspended in mineral oil characteristic absorption in the infrared region of the spectrum at the following frequencies expressed in reciprocal centimeters: 3340, 1678, 1623, 1597, 1315, 1248, 1229, 1175, 1140, 1061, 1036, 1002, 964, 949, 864, 823, 796, 781, 743, 719, 692, and 667; and its formate melts substantially at 176°–177° C. and has the empirical formula $$C_{22}H_{24}N_2O_8 \cdot HCOOH.$$

Tetracycline exerts an inhibiting action on the growth of many bacteria, as described in detail below.

In accordance with the present invention, tetracycline is prepared among other methods by the cultivation under particular controlled conditions of a hitherto undescribed species of micro-organism which we have tentatively called *Streptomyces BL 567201* which was isolated from a sample of soil. A culture of the living organism which has been isolated from this soil and identified as *Streptomyces viridifaciens* has been deposited in the American Type Culture Collection, Washington, D.C. and added to its permanent collection of microorganisms as A.T.C.C. 11989. The description of this organism is set forth in the following.

The organism *Streptomyces viridifaciens* which produces tetracycline belongs to the genus distinguished as Streptomyces. Growth of this organism is good on glycerol-asparagine-beef extract agar at 30° C. On this medium mouse-gray aerial hyphae are formed and a yellowish-green pigment is secreted into the agar medium. The mycelium is composed of branched hyphae, the younger elements of which are Gram-positive. Condida are produced on aerial hyphae.

The above color descriptions are from: Dictionary of Color; by Maerz and Paul, 1st edition.

It is to be understood that for the production of tetracycline we do not wish to limit ourselves to this particular organism or to organisms fully answering the description herein which is given merely for illustrative purposes. We especially wish to include the use of organisms which are mutants produced from the described organism by mutating agents such as X-radiation, ultraviolet radiations, nitrogen mustards, etc.

Tetracycline is a valuable therapeutic agent, e.g. in human or veterinary medicine. Tetracycline possesses the particular advantages of a broad spectrum, high blood levels and low toxicity. Tetracycline exhibits highly useful resistance to degradation by heat or water in either acid or alkaline media. Certain metal and acid-addition salts of tetracycline have been found to be even more useful than tetracycline base by virtue of their decreased hygroscopicity and increased solubility in water.

The antibiotic, tetracycline, has been found to be active in vitro against a number of Gram-positive and Gram-negative bacteria. The following chart shows the antibiotic activity of Omegamycin (lot 25), Aureomycin HCl, Terramycin HCl, and tetracycline when placed in a trench cut in a plate of heart infusion agar (pH 7.0):

PLATE SPECTRUM
[5 mg./ml.]

| Organism | Zone of Inhibition in mm. | | | |
|---|---|---|---|---|
| | Tetracycline. (Isolated Fermentation broth.) Lot 25. (5 mg./ml.) | Tetracycline. (Prepared by Dechlorinating Chlortetracycline.) (5 mg./ml.) | Aureomycin (3 mg./ml.) | Terramycin (1 mg./ml.) |
| Bodenheimer org | 6 | 8 | 11 | 9 |
| Proteus X19 | 7 | 8 | 8 | 10 |
| Sh. sonnei | 5 | 8 | 10 | 11 |
| S. enteritidis | 9 | 11 | 11 | 13 |
| S. paratyphi A | 10 | 12 | 13 | 15 |
| S. pullorum | 8 | 11 | 11 | 13 |
| A. aerogenes | 5 | 6 | 9 | 11 |
| Ps. fluorescens | 1 | 7 | 9 | 13 |
| Alc. fecalis | 6 | 11 | 8 | 8 |
| Pr. vulgaris | 0 | 6 | 4 | 0 |
| V. cholerae | 8 | 11 | 11 | 14 |
| Neisseria sp | 8 | 7 | 8 | 11 |
| C. xerosis | 11 | 14 | 14 | >27 |
| M. mycoides | 10 | 10 | 16 | >27 |
| B. cereus | 10 | 11 | 13 | 17 |
| S. marcescens | 0 | 2 | 2 | 0 |
| M. tetragenus | 11 | 15 | 27 | >27 |
| S. flexneri | 14 | 11 | 10 | 14 |
| S. dysenteriae | 9 | 11 | 10 | 15 |
| C. albicans | 6 | 0 | 0 | 0 |
| Staph. aureus | 10 | 13 | 13 | 18 |
| E. typhosa | 7 | 9 | 10 | 13 |
| E. coli | 4 | 7 | 11 | 11 |
| S. paratyphi B | 9 | 11 | 16 | 14 |
| K. pneumoniae | 5 | 6 | 16 | 14 |
| Ps. aeruginosa | 1 | 4 | 9 | 7 |
| S. gallinarum | 8 | 11 | 12 | 13 |
| B. anthracis | 7 | 10 | 19 | >27 |
| S. schottmulleri | 10 | 12 | 12 | 15 |
| B. subtilis | 10 | 9 | 11 | 13 |
| B. mycoides O | 13 | 8 | 15 | 20 |

The spectrum test is performed as follows: Approximately 30 ml. of sterile heart infusion broth (Difco), with 2% of agar added as a solidifying agent, is placed in a sterile Petri dish (3½" diameter) and allowed to harden. A trench 8 mm. x 40 mm. is then made in the agar with a sterile spatula. The bottom of the trench is sealed with a drop or two of melted agar. A streak is then made from a 24-hour nutrient broth culture of each test bacterium, previously incubated at 37° C., with a small loop, streaking from the edge of the trench to the wall of the Petri dish. The trench is next filled with a 5 mg./ml. solution of the antibiotic. The dish is then placed at 37° C. for 18-24 hours. A linear measurement of the zone of inhibition is made from the edge of the trench to the point where growth of the test organism occurs, after the selected number of hours within the period indicated.

The following is a summary of antibacterial activity tests in vitro with crystalline tetracycline hydrochloride and three other antibiotics. The test used was a tube dilution technique and the minimal concentrations of antibiotic completely inhibiting growth of the bacteria were determined. Heart infusion broth was used as the medium for all test organisms, except as noted.

| Organism | Inhibitory Concentration, mcg./ml. | | | |
|---|---|---|---|---|
| | Tetracycline HCl | Chlortetracycline HCl | Oxytetracycline HCl | Chloramphenicol |
| Micrococcus pyogenes var. aureus | 0.15 | 0.25 | 0.25 | 5.0 |
| Gaffkya tetragena | 0.03 | 0.06 | 0.13 | 5.0 |
| Streptococcus pyogenes C203 [1] | 2.5 | 0.06 | 0.06 | 0.63 |
| Streptococcus agalactiae 7077 | 0.3 | 0.13 | 0.13 | 1.25 |
| Streptococcus dysgalactiae 9926 | 1.25 | 0.25 | 0.13 | 1.25 |
| Streptococcus uberis | | 0.13 | 0.13 | 2.5 |
| Diplococcus pneumoniae [1] | 0.15 | 0.06 | 0.06 | 1.25 |
| Lactobacillus acidophilus #4356 [2] | 0.6 | 0.50 | 1.0 | 2.5 |
| Lactobacillus casei #4646 [2] | 1.25 | 0.50 | 1.0 | 5.0 |
| Lactobacillus leichmannii [2] | 2.5 | 0.50 | 1.0 | 2.5 |
| Bacillus anthracis | 0.0375 | 0.02 | 0.03 | 2.5 |
| Bacillus cereus var. mycoides | 0.0375 | 0.02 | 0.03 | 2.5 |
| Bacillus subtilis | 5.0 | 1.0 | 1.0 | 2.5 |
| Corynebacterium xerosis | 0.6 | 0.25 | 0.25 | 0.63 |
| Clostridium welchii 601 [3] | 0.06 | 0.06 | 0.13 | >6.25 |
| Clostridium welchii M [3] | 0.25 | 0.13 | 0.25 | >6.25 |
| Clostridium sporogenes 84 [3] | 0.125 | 0.25 | 0.25 | 6.25 |
| Clostridium sporogenes 40 [3] | 0.06 | 0.06 | 0.13 | 6.25 |
| Salmonella typhosa | 2.5 | 0.39 | 0.78 | 1.56 |
| Escherichia coli | 2.5 | 1.56 | 1.56 | 12.5 |
| Shigella sonnei | 1.25 | 0.39 | 0.78 | 1.56 |
| Klebsiella pneumoniae | 2.5 | 0.78 | 0.78 | 1.56 |
| Proteus vulgaris | 10.0 | 12.5 | 25.0 | 6.25 |
| Pseudomonas aeruginosa | 10.0 | 6.25 | 1.56 | 50.0 |
| Neisseria sp | 2.5 | <0.19 | 1.56 | 50.0 |
| Candida albicans #520 | >100 | 100 | >100 | >50 |

[1] Assayed in 10% serum broth.
[2] Assayed in tomato juice broth.
[3] Assayed in thioglycollate broth.

The following is the diffusion plate assay method for determining the activity of tetracycline.

Culture Medium

Streptomycin Assay Agar (with yeast extract) was purchased from the Baltimore Biological Laboratories, Baltimore, Maryland, and used as directed on the label. A suitable preparation may be made by suspending in one liter of distilled water to a final pH of 6.2 or 8.0 a mixture of 1.5 g. beef extract, 3 grams yeast extract, 6.0 grams peptone (e.g. Gelysate) and 15 g. agar. The suspension is allowed to stand for five minutes, mixed until a uniform suspension is obtained and heated gently with stirring. The suspension is boiled one or two minutes or until solution has occurred. The culture medium is then dispensed and sterilized at 121° C. (fifteen pounds per square inch of steam pressure, gauge, for fifteen minutes).

Inoculum

The test organism is Bacillus subtilis American Type Culture Collection 6633. A spore suspension containing 50,000,000 viable spores per ml. is added to the above-described melted assay agar (cooled to 53° C.) to give a final inoculum of 2%.

Preparation of plates

Twenty-one ml. of the sterile assay agar prepared as above described are placed in each of a plurality of level sterile Petri plates and allowed to solidify. Four ml. of inoculated agar are then distributed evenly over the surface of the base layer in each plate. Stainless steel templates containing a series of holes are placed on the medium after the latter has cooled to room temperature and the samples of antibiotic material to be assayed are placed within the holes.

Buffer

Buffer at pH 6.2 or 8.0 as desired is used for making dilutions. Thus at pH 6.2 a citrate buffer is used for making dilutions. This is prepared by mixing 192.12 g. of anhydrous citric acid with 106.3 g. sodium hydroxide in a liter of distilled water and diluting the mixture to one-tenth concentration with distilled water. The pH of the buffer must be checked potentiometrically, and, if necessary, adjusted to pH 6.2 by the addition of citric acid or sodium hydroxide. Variations in pH or concentration of the buffer affect the sizes of inhibition zones markedly. It has not been found necessary to sterilize the buffer. The stock solution is preserved with chloroform or toluene and fresh working solutions prepared daily.

At pH 8.0 a phosphate buffer is used for making dilutions. This is prepared by mixing 95 ml. of molar $K_2HPO_4$ with 5 ml. of molar $KH_2PO_4$ and diluting the mixture to one-tenth concentration with distilled water. The pH of the buffer must be checked potentiometrically, and, if necessary, adjusted to pH 8.0 by addition of one or the other phosphate solution. Variations in pH or concentration of the buffer affect the sizes of inhibition zones markedly. It has not been found necessary to sterilize the buffer. The stock solution is preserved with chloroform or toluene and fresh working solutions prepared daily.

Assay

Unknown samples are diluted, if required, in the buffer. Three holes on each plate are used to receive a single dilution of the sample. Following incubation at 32° C. the diameters of the zones are measured and averaged.

*Streptomyces viridifaciens* was differentiated from a strain of *S. aureofaciens* (NRRL 2209) obtained from the Northern Regional Research Laboratory, Peoria, Illinois, where it had been deposited as an authentic aureomycin-producing strain, by observation of growth characteristic on glycerol asparagine beef extract agar and Czapek-Dox agar containing 1% dextrin. The agar mixtures employed and the results obtained were as follows:

GLYCEROL ASPARAGINE BEEF EXTRACT AGAR

|  | Percent |
|---|---|
| Glycerol | 1 |
| Asparagine | 0.05 |
| Beef extract | 0.2 |
| $K_2HPO_4$ | 0.05 |
| Agar | 1.5 |
| Sterile water, q.s. 100%. | | pH, 7.2

| | *Streptomyces viridifaciens* | *Streptomyces aureofaciens* |
|---|---|---|
| Growth | Good | Good. |
| Sporulation | do | Do. |
| Diffusible pigment | Yellowish-green | None. |
| Spiral formation | Abundant, loosely wound. | Do. |
| Aerial Hyphae | Mouse-gray | Rose-gray. |
| Reverse | Brown | Olive-drab. |

DEXTRIN CZAPEK-DOX

|  | Percent |
|---|---|
| $NaNO_3$ | 0.2 |
| $K_2HPO_4$ | 0.1 |
| $MgSO_4$ | 0.05 |
| KCl | 0.05 |
| $FeSO_4$ | Trace |
| Agar | 1.5 |
| Sterile water, q.s. 100%. | | pH, 7.2

| | *Streptomyces viridifaciens* | *Streptomyces aureofaciens* |
|---|---|---|
| Growth | Fair to good | Fair. |
| Sporulation | Good | Poor. |
| Diffusible pigment | None | None. |
| Spiral formulation | Abundant, loosely wound. | Sparse, very loosely wound. |
| Aerial hyphae | Mouse-gray | Buff to gray. |
| Reverse | Light brown | Buff to tan. |

The *Streptomyces viridifaciens* is further characterized by production of an intense bluish-green pigment when grown in submerged culture in a medium containing 1% sucrose, 1% soy bean meal, 1% soy peptone, 1.5% $KH_2PO_4$, and 0.5% $(NH_4)_2HPO_4$. *Streptomyces aureofaciens* (NRRL 2209) does not produce this pigment.

*Streptomyces viridifaciens* was further distinguished from *Streptomyces aureofaciens* by the following, tabulated observations:

| Medium | *Streptomyces aureofaciens* NRRL 2209 | *Streptomyces viridifaciens* |
|---|---|---|
| Nutrient agar | Good growth. Production of aerial hyphae and spores is inhibited somewhat and is white to gray in color. Straw soluble pigment. | Good growth. No aerial mycelium, colony tan to light brown. Cinnamon soluble pigment. |
| Asparagine-meat extract-dextrose agar. | Good growth. Abundant aerial mycelium and spores, cement gray to frost gray in color. India buff soluble pigment. | Good growth. Abundant aerial mycelium and spores, gull colored, India buff soluble pigment. |
| Potato slants | Growth raised, surface nodulate, India buff color. | Growth raised, surface nodulate, ecru-beige color. |
| Litmus Milk | Neither significant pH change nor apparent peptonization in 15 days. | Alkaline with peptonization. Very good growth. |

This invention embraces a process for growing species of microorganisms at about 24°–30° C. under submerged conditions of agitation and aeration on media consisting of sterile water containing a source of carbon, a source of nitrogen, a source of growth substances, mineral salts such as sodium chloride, potassium phosphate, magnesium sulfate, sodium nitrate and, when desired, a buffering agent such as calcium carbonate.

As a source of carbon in the nutrient medium carbohydrates are satisfactory. Any of the following can be used.

| | |
|---|---|
| Ordinary starch | Xylose |
| Soluble starch | Arabinose |
| Sucrose | Rhamnose |
| Glucose | Fructose |
| Maltose | Lactose |
| Dextrose | Inulin |
| Glycerol | Dextrins |
| Galactose | Mannitol |

These carbon sources are supplied to the medium in purified form or in the form of concentrates. The amount of such carbon sources for best antibiotic production in the medium varies considerably, from about ½% to 5%, by weight of the total weight of the fermentation medium.

Suitable sources of nitrogen, including some sources of growth substances, and including organic and inorganic nitrogen-containing compounds and proteinaceous materials in particular, for the fermentation process include a wide variety of substances such as:

Amino acids
Casein, both hydrolyzed and unhydrolyzed
Fish meal
Soy bean meal
Meat extracts
Liver cake
Urea
Nitrates
Ammonium compounds
Distillers grain slop
Corn-steeping liquor
Wheat-steeping liquor
Whey or whey concentrates
Acid hydrolyzed corn gluten
Acid hydrolyzed wheat gluten
Peptone Offals
Brewers yeast
Cottonseed meal
Lactalbumin
Tryptone
Palm oil meal
Coconut oil meal
Linseed oil meal
Peanut oil meal
Sunflower oil meal These proteinaceous ingredients need not be applied in a high degree of purity; the less pure materials which carry traces of growth factors and considerable quantities of mineral nutrients are suitable for use. It is not possible, of course, because of the crude nature of many of these nitrogenous substances to specify definite proportions of the material to be added. An amount of about 0.1% to 5.0% by weight on a solid basis describes the useful range of nitrogenous substances to be added to the media in most cases. Particularly high yields are obtained by the use of media containing soy proteoses or soy peptones, that is, degraded soy bean products, including hydrolyzed soy bean meal.

Among the mineral salts used in the medium are certain heavy metal salts useful in trace amounts and often found to such extent in crude, natural components of the media, such as corn steep liquor. When not present in other components of the media, these salts are added and found to increase the yield of tetracycline. Thus, sufficient manganese, copper and particularly zinc are introduced to insure that the amounts present both as impurities in other material and by addition are at least approximately 0.00033% manganese as $MnCl_2 \cdot 4H_2O$, 0.00033% copper as $CuSO_4 \cdot 5H_2O$, and 0.003% zinc as $ZnSO_4 \cdot 7H_2O$.

The pH of the fermentation medium should be about 5.0–6.5 and preferably 5.8–6.2 at the start of the fermentation. The preferred temperature of the fermentation process is about 24°–30° C. The maximum yield of product is usually obtained in 1–5 days, varying with the method of cultivating the Streptomyces.

Omegamycin (tetracycline) is active in vivo as well as in vitro and displays marked chemotherapeutic activity against experimental infection in mice. The results of such testing and of determinations of toxicity are given in the following table.

| Omegamycin Lot No. | Plate Assay Response in mm. | Acute Toxicity $LD_{50}$ mg./kg., mouse, intravenous | $CD_{50}$ mg./kg., mouse, intraperitoneal |
|---|---|---|---|
| 1 | 25 at 1 mg./ml | 98–171 | 45 |
| 25 | 28 at 1/16 mg./ml | | 4.6 |

The $CD_{50}$ (Curative Dose—50) is the minimum dose of Omegamycin which will cure 50 percent of a group of mice injected intraperitoneally with 100 to 1000 $LD_{50}$ doses of *Diplococcus pneumoniae*, each $LD_{50}$ dose being sufficient if given alone to kill 50 percent of a group of mice. The infection is given at once after the second dose of the test drug. The test drug is given in two equally divided doses at approximately an 18-hour interval. The animals are observed for four days and deaths for each group expressed as the percentage of the total animals per group. The percentage death is transformed to probit values and these plotted against the log of the dose in mgm. per kg. of mouse weight. The point of intersection of the probit 5 line and the best line constructed through the experimental points indicates the concentration of drug which should protect half of the animals under the conditions of the experiment. The antilog of this term is called $CD_{50}$ value.

EXAMPLE 1

In preparing tetracycline on a laboratory scale, the fermentation is conducted in shaker bottles open to the air but protected from contamination with cotton or gauze covers. *Streptomyces viridifaciens* is grown in a suitable nutrient medium by the submerged culture method, agitation and aeration of the culture being effected by placing the bottles on a reciprocating type shaker which provides spraying, splashing or spilling of the mash through an oxygen-containing atmosphere. As a typical case, 500 ml. of a culture medium composed of

| | Percent |
|---|---|
| Sucrose | 1 |
| Soy bean meal | 1 |
| Soy peptone | 1 |
| $KH_2PO_4$ | 1.5 |
| $(NH_4)_2HPO_4$ | 0.5 |
| Water, q.s. | 100% | are introduced into 4 liter bottles and sterilized. After autoclaving, the medium is inoculated with about 1%, by volume, of a turbid aqueous spore suspension of the Streptomyces from an agar slant. The pH is 6.0–6.2 at the start of the fermentation. The contents of the bottle are then incubated at 26°–28° C. for 48 hours while shaking at 130 strokes per minute with a 1¼″ stroke. At the end of the incubation period the fermentation liquor was a bluish-green and when assayed by the method described above, gives inhibition zones of approximately 27 mm. when the broth is diluted 30-fold. This broth contains tetracycline which can be isolated as described below.

EXAMPLE 2

For larger scale production of tetracycline, an inoculum is prepared in a fermentation medium containing, by weight,

| | Percent |
|---|---|
| Corn steep | 1 |
| Sucrose | 1 |
| $(NH_4)_2HPO_4$ | 0.5 |
| $KH_2PO_4$ | 1.5 |
| $MgSO_4 \cdot 7H_2O$ | 0.2 |
| Water, q.s. | 100 | pH 6.2–6.4 made up in a volume of 2500 ml. and introduced into a 2½ gallon bottle. The medium is sterilized with steam at 118°–120° C. for one hour. When cool, the medium is inoculated with about 0.5%, by volume, of a turbid, aqueous spore suspension of the Streptomyces from an agar slant. The contents of the bottle are then incubated at 26°–28° C. for 48 hours on a reciprocating type shaker and sterile air blown over the surface of the liquid. From the inoculum bottle the broth containng the *Streptomyces viridifaciens* is transferred into the tank fermenter under completely aseptic conditions (see Example 3). When desired, the liquor may be processed as described below and the tetracycline isolated.

EXAMPLE 3

The antibiotic produced by *Streptomyces viridifaciens*, tetracycline, may be prepared on a large scale by submerged or deep culture. Stationary vat fermenters equipped with suitable agitation and aeration have been found to be useful for this purpose. A nutrient medium consisting of 56.8 liters of corn steep, 56.8 kg. sucrose, 28.4 kg. $(NH_4)_2HPO_4$. 85.2 kg. $KH_2PO_4$, 11.3 kg. $MgSO_4 \cdot 7H_2O$ and water to make 1500 gallons is suitable. This medium may be prepared in a 2000-gallon glass-lined fermenter equipped with a water-jacket for temperature control, a suitable stainless steel agitator and a suitable sparging device for aeration. The medium is sterilized by heating with steam under pressure and is then cooled. After sterilization the hydrogen ion concentration of the medium should be approximately pH 6.2. The nutrient medium is inoculated with 15%, by volume, of a vegetative culture grown either in a similar type fermenter previously inoculated with an inoculum described earlier or with an inoculum prepared in the laboratory. The culture in the 2000 gallon fermenter is incubated at a temperature of 83° F. for two or three days. During the incubation the impeller is revolved at the rate of 90 r.p.m. and sterile air is introduced into the medium through the sparger at the rate of 100 cubic feet per minute. At the end of the incubation period the culture fluid normally contains sufficient antibiotic activity to result in a zone of inhibition against the test organisms of approximately 23 mm. in diameter when a 16-fold broth dilution is tested by the assay procedure described above. The tetracycline is isolated as described below.

EXAMPLE 4

Fermentation liquor containing tetracycline is produced by following the procedure of Example 1, using the following culture medium:

|  | Percent |
|---|---|
| Wheat gluten | 1 |
| Glycerol | 1 |
| NaCl | 0.5 |
| Distiller's solubles | 0.05 |
| CaCO$_3$ | 0.1 |
| Water, q.s. | 100 |

EXAMPLE 5

Fermentation liquor containing tetracycline is produced by following the procedure of Example 1, using the following culture medium:

|  | Percent |
|---|---|
| Cottonseed meal | 1 |
| Glucose | 1 |
| Distiller's soluble | 0.05 |
| NaCl | 0.5 |
| CaCO$_3$ | 0.1 |
| Water, q.s. | 100 |

EXAMPLE 6

Fermentation liquor containing tetracycline is produced by following the procedure of Example 1, using the following culture medium:

|  | Percent |
|---|---|
| Corn steep liquor | 1 |
| Cerelose | 1 |
| NaCl | 0.5 |
| CaCO$_3$ | 0.1 |
| Water, q.s. | 100 |

EXAMPLE 7

Fermentation liquor containing tetracycline is produced by following the procedure of Example 1, using the following culture medium:

|  | Percent |
|---|---|
| Soy bean meal | 1 |
| Cerelose | 1 |
| NaCl | 0.5 |
| Yeast extract | 0.05 |
| CaCO$_3$ | 0.1 |
| Water, q.s. | 100 |

EXAMPLE 8

Fermentation liquor containing tetracycline is produced by following the procedure of Example 1, using the following culture medium:

|  | Percent |
|---|---|
| Soy bean meal | 3 |
| Corn starch | 0.5 |
| N–Z–Amine B (Enzymatic digest of casein) | 0.1 |
| NaNO$_3$ | 0.3 |
| CaCO$_3$ | 0.5 |
| Water, q.s. | 100 |

EXAMPLE 9

Fermentation liquor containing tetracycline is produced by following the procedure of Example 1, using the following culture medium:

|  | Percent |
|---|---|
| N–Z–Amine B | 1 |
| Cerelose | 1 |
| Yeast extract | 0.5 |
| NaCl | 0.5 |
| CaCO$_3$ | 0.1 |
| Water, q.s. | 100 |

After fermentation has been completed and as illustrated below by Examples 10 through 16, 18 through 22, 25, 27, and 29, tetracycline was formerly recovered from the broth, for example, by filtering to remove the mycelium, stirring the broth (preferably at about pH 8.5) with butanol or methyl isobutyl ketone, separating the solvent layer containing the tetracycline, concentrating it to small volume by distillation, and mixing it with a liquid lower hydrocarbon, e.g. Skellysolve C, to precipitate solid tetracycline as the base, if the extracted broth was at alkaline pH, e.g. pH 8.5, and as the hydrochloride, if, for example, the broth had been acidified before extraction with hydrochloric acid. The solid tetracycline so produced was further purified by slurrying into ammonium hydroxide and also by adsorption from a solution of the free base on to a chromatographic adsorbent (e.g., a silica such as Florisil), followed by washing (e.g., acetone or methanol) to remove impurities and then elution with an acid. The purified tetracycline acid salt in the eluate is then recovered by crystallization, precipitation, lyophilization, or the like. The liquor lower hydrocarbons used as precipitating agents are commercially available petroleum ethers, e.g. Skellysolve A, B.P. 28°–38° C.; Skellysolve B, B.P. 60°–71° C.; Skellysolve C, B.P. 85–100° C.

According to the improved processes provided by the present invention and after fermentation has been completed, the tetracycline is recovered from the fermentation broth by an alkaline precipitation. Fundamentally, the fermentation broth is adjusted to an alkaline pH in the range of 8 to 11 inclusive and the precipitated mixture of mycelium (mat) and tetracycline is collected by filtration. As a variant of this process, the fermentation broth is acidified to less than pH3, filtered to remove the mycelium, and the filtrate is treated as above, that is, it is adjusted to an alkaline pH in the range of 8 to 11 inclusive and the precipitate of crude tetracycline is collected by filtration. Any water soluble alkali of sufficient strength is used, ammonia or sodium hydroxide are preferred. The pH is adjusted to the range of 8 to 11 inclusive; an alkaline pH in the range of 9 to 10 is preferred. The precipitate of of tetracycline, with or without accompanying mycelium is brought into solution for further manipulation as desired according to any of the procedures disclosed herein by solution in aqueous acid below pH 3 or in aqueous alkali above pH 11. Examples of such aqueous acids include water-soluble acids furnishing the desired pH, e.g. hydrochloric acid, sulfuric acid, phosphoric acid and nitric acid. These same acids are effective in lowering the pH of fermentation broth below pH 3, and preferably to about pH 2.0–2.5, to permit separation of tetracycline, which is in solution as an acid addition salt, from the solid mycelium by filtration before use of the alkaline precipitation described above.

Various acid addition salts of tetracycline may be prepared, most simply by adding the desired acid, inorganic (including mineral acids) or organic, to the antibiotic in water until a clear solution is obtained. The solid salts may be prepared by adjusting the pH of such a solution of a tetracycline salt to a point just below that at which the antibiotic would begin to separate. The solution may then be dried, as by subjecting the frozen solution to a vacuum. Acids salts of tetracycline are obtained by evaporation of a solution of the salt in water at a low pH. Mineral acids which may be used are hydrochloric acid, sulfuric acid and phosphoric acid. Organic acids which may be used are citric acid, tartaric acid, gluconic acid, benzoic acid, acetic acid, ascorbic acid, succinic acid, nicotinic acid, formic acid, maleic acid, and so forth. Since tetracycline is amphoteric, salts of various metallic elements with the antibiotic may be prepared, e.g. sodium, potassium, calcium, magnesium. The alkali metal salts of tetracycline are formed by treating an aqueous suspension of the antibiotic with two equivalents of an alkaline hydroxide. The solid metal salts of tetracycline are obtained by the evaporation under vacuum of an aqueous solution of the antibiotic at the proper pH. Preparation of tetracycline from neutral solution, as by lyophilization, produces the free base, generally as a trihydrate if water is present and heat is not applied. Tetracycline trihydrate is also prepared by dissolving the base in a water-soluble organic solvent, e.g. methanol, ethanol, and pouring the resulting solution into water. Solid calcium tetracycline is converted to tetracycline trihydrate by solution in aqueous acid, e.g. to pH 3 or less using sulfuric acid or hydrochloric acid, followed by the addition of an agent to tie up the calcium, e.g., sodium Versenate (ethylenediamine-tetraacetic acid), and finally by addition of an alkali to raise the pH to at least 6 but not substantially above pH 8 whereupon tetracycline trihydrate precipitates. Tetracycline trihydrate is recrystallized from aqueous alcohols, e.g., methanol, and is converted to the anhydrous form by the application of moderate heat in vacuo over a drying agent.

The acid addition salts of tetracycline are prepared in various ways. For example, stoichiometric amounts of acid are added to a solution of tetracycline base in water or an organic solvent, e.g., butanol, acetone, methanol, to form the acid addition salt; when desired the solid salt is then isolated by lyophilizing the resulting mixture (as in water), or by collecting the precipitated salt by filtration (as from ethyl acetate), or by precipitating the salt by the addition of another organic solvent (as in the addition of a hydrocarbon, e.g., Skellysolve, to butanol or cyclohexane to ethyl acetate), or by reducing the volume of solvent by distillation in vacuo until the salt precipitates upon cooling (e.g., from butanol). Many other methods are used to prepare these salts, e.g., tetracycline is converted to tetracycline hydrochloride by adsorption of tetracycline on a chromatographic adsorbent (e.g., a silica such as Florisil) followed by elution of tetracycline with acid, e.g., aqueous or methanolic or butanolic hydrochloric acid. In another method tetracycline base in water having pH about 8–9 is extracted into butanol; the butanol is separated and the tetracycline base is converted to tetracycline hydrochloride and transferred to an aqueous phase by extraction with aqueous hydrochloric acid; the tetracycline hydrochloride so prepared may be isolated if desired, e.g., by lyophilization. In one preferred method, tetracycline base is converted to tetracycline salts by dissolving the base in dry acetone or n-propanol and adding the anhydrous acid, i.e., hydrogen chloride gas, sulfuric acid, sulfuric acid in dry acetone, phosphoric acid, tartaric acid, citric acid, nitric acid in dry methyl isobutyl ketone, and collecting by filtration the salt which precipitates, e.g., tetracycline hydrochloride or the sulfate, phosphate, tartrate, citrate, etc.

EXAMPLE 10

Tetracycline is readily extracted from alkaline fermentation liquors by non-polar organic solvents. The following procedure has been used.

One liter of Streptomyces viridifaciens fermentation broth at pH 8.5 is extracted with 0.5 liter methyl isobutyl ketone. The organic solvent is separated, washed with water, reduced by azeotropic distillation to a volume of about 20 mls. and added to 250 mls. Skellysolve C. Twenty mgm. of tetracycline (lot 26) precipitate and are collected by filtration and found to have an activity at one mgm./ml. diluted 1:64 of 19.5 mm. (zone diameter by B. subtilis plate assay on pH 6.2 agar); 24.2 mm. at 1:16 and 27.7 mm. at 1:4. The original broth assayed at 27.3 mm. at 1:4 dilution.

EXAMPLE 11

In another procedure, 4.5 liters of Streptomyces viridifaciens fermentation broth at pH 6.7 are adjusted to pH 5.5 and extracted with 3 liters butanol. The butanol extract is separated, washed with water, reduced in volume to about 35 mls. by azeotropic distillation and added to 350 mls. Skellysolve C (technical heptanes). Tetracycline (lot 27) precipitates as a solid and is collected by filtration (1.2 grams, having an activity at one mgm./ml. diluted 1:16 of 23.2 mm.; zone diameter by B. subtilis plate assay agar at pH 6.2).

The residual broth at pH 5.5 after extraction with butanol is adjusted to pH 8.5 and extracted with 3 liters butanol. The butanol is separated, washed with water, reduced in volume to about 30 mls. and added to 350 ml. Skellysolve C. Crude tetracycline (lot 28) precipitates as an orange-yellow solid having an activity at one mgm./ml. diluted 1:16 of 25.2 mm. (zone diameter of B. subtilis plate assay on pH 6.2 agar). The original broth assayed 27.3 mm. at 1:4 dilution.

EXAMPLE 12

In a third procedure 2.5 liters of Streptomyces viridifaciens fermentation broth assaying 25.7 mm. at 1:4 dilution is adjusted to pH 6.4 and extracted with 2 liters butanol. The butanol is separated, washed with water, reduced in volume to about 50 ml. by azeotropic distillation and added to one liter Skellysolve C. Dark yellow, solid tetracycline (500 mgm.) (lot 24) precipitates and is collected by filtration and found to have an activity at 1 mg./ml. diluted 1:16 of 18 mm. (zone diameter by B. subtilis plate assay on agar at pH 6.2) and 23 mm. at 1:4 dilution.

The broth at pH 6.4 after butanol extraction is kept in the cold room for three days, and then adjusted to pH 8.5 with sodium hydroxide and extracted with 2 liters butanol. The butanol is separated, washed with water, reduced in volume to about 30 ml. by azeotropic distillation and added to 600 ml. Skellysolve C. Dark brown, solid tetracycline (140 mg.) (lot 25) precipitates and is collected by filtration and found to have an activity at one mg./ml. diluted 1:16 of 28 mm. (zone diameter by B. subtilis plate assay on pH 6.2 agar).

EXAMPLE 13

In another procedure 760 ml. of Streptomyces viridifaciens fermentation broth adjusted to pH 9.4 with sodium hydroxide is extracted with 380 ml. n-butanol. The n-butanol is separated, added to aqueous hydrochloric acid to give pH 7.35, and the butanol is removed by vacuum distillation; the residual aqueous concentrate is made up to about 38 cc. with water, and lyophilized to yield 339 mgm. solid tetracycline, which is found to have an activity at one mg./ml. buffer of 25 mm. (zone diameter by B. subtilis plate assay on pH 6.2 agar) and of 18.7 mm. at 1:3 dilution. The original broth assayed 26.3 mm. (and 20.0 mm. at 1:3 dilution) and the spent broth assayed 19.0 mm. (and 12.7 mm. at 1:3 dilution).

EXAMPLE 14

In another procedure 5.5 liters of Streptomyces viridifaciens fermentation broth adjusted to pH 5.5 is extracted with 3 liters n-butanol. The solvent is separated, washed with water, reduced in volume to about 35 mls. by azeotropic distillation and added to 350 mls. Skellysolve C. Golden yellow, solid tetracycline (1.2 g.) precipitates and is collected by filtration as solid A and found to have an activity at 1 mgm./ml. diluted 1:16 of 23.2 mm. (zone diameter by B. subtilis plate assay on agar at pH 6.2) and 26.9 mm. at 1:4 dilution.

The residual broth, after butanol extraction at pH 5.5 is adjusted to pH 8.5 and extracted with 3 liters of butanol. The butanol is separated, washed with water, reduced in volume to about 30 mls. by azeotropic distillation and added to 350 mls. Skellysolve C (technical heptanes). Additional orange-yellow, solid tetracycline (0.5 g.) (lot 30) precipitates and is collected by filtration as solid B and found to have an activity at 1 mgm./ml. diluted 1:16 of 25.2 mm. (zone diameter by *B. subtilis* assay on agar at pH 6.2) and 28.5 mm. at 1:4 dilution.

having $R_f$ values of 1 to 10 inclusive. A small spot in the exact center would thus have a value of $R_f$ 6 while a larger spot would extend into the adjacent zones and have $R_f$ 5, 6, 7 as the entire zone is counted.

Using this technique, the $R_f$ spectra of tetracycline (lot 30) is found to be as follows, using 5 microliters of a 1 mgm./ml. solution of the antibiotic as a sample for each strip and assaying with *B. subtilis* in pH 6.2 agar, for the strips developed in the twelve solvent systems:

| Solvent System | A | B | C | D | E | F | G | H | I | J | K | L |
|---|---|---|---|---|---|---|---|---|---|---|---|---|
| $R_f$ Value | 6, 7 | 5, 6 | 4, 5 | 4, 5, 6 | 1 | 8, 9, 10 | 6, 7 | 8 | 5 | 9, 10 | 6, 7, 8 | 3, 4, 5 |

Tetracycline is conclusively characterized, even when contaminated by similar organic chemicals by its "spectrum" of activity (i.e., degree of migration or $R_f$ values) using a series of solvents in the procedure known as paper strip chromatography. This technique is a relatively new but already well-established procedure for the identification of organic compounds; as with infra-red maxima the $R_f$ values in a series of solvent systems are a unique and reproducible characteristic of a given chemical and serve as a "fingerprint."

The procedure used is as follows. Strips of ash-free, dense, highly retentive filter paper (e.g., 589 Blue Ribbon Special from Carl Schleicher and Schuell Co., Keene, N.H.), half inch wide and 58 cm. long, are suspended at constant room temperature in a protected area (i.e., in a large jar) from the edge of a dish. The top of each strip is in contract with a supply of particular solvent system (also called developing phase) in the dish; each of the strips is suspended from a different dish containing a different one of the plurality of solvent systems used in the test; the bottom of each strip hangs free and does not reach the supply of its solvent system (or volatile components thereof) placed below the hanging strip to facilitate saturation of the air with the solvent in use.

The product to be examined (i.e., in a fermentation broth or as an isolated solid) is placed on a marked spot at the top of that portion of the strip which hangs free in the air. In the case of a solid, it is dissolved in any useful solvent. The amounts used are those giving a convenient zone size on final assay as determined by simple trial. For example, a useful amount is 5 microliters (0.005 ml.) of a solution containing 1 mgm./ml. of tetracycline to solvent for subsequent assay vs. *B. subtilis*. The strip is dried and then placed with its upper end in position in the dish, which contains the selected solvent system. The solvent is allowed to migrate downward, that is, to develop the strip, until the solvent front reaches the bottom of the strip. This requires about fifteen hours; the surrounding atmosphere is maintained at a constant temperature free from drafts and saturated with solvent vapor from a pool below.

Each strip is then removed, air-dried and placed on a tray of agar of controlled pH (here 6.2) inoculated with a test organism, in this case *B. subtilis*. After standing in the refrigerator overnight, the strips developed by the different solvent systems are removed, and the trays are marked for identification and location of the strips, incubated overnight and either read directly or photographed to give a permanent record.

The outline of the whole strip is usually visible on the agar surface and often on the photograph. The location of each antibiotic agent on the strip is marked by a clear area, which contrasts with the turbid area where the test organism has grown. The strip as shown on the photograph is marked off into zones representing 5, 10, 10, 10, 10, 10, 10, 10, 10 and 15 percent of the distance from the point of sample application to the bottom, respectively, and these zones are described as The composition of these solvent systems is as follows:
A—Water
B—10% aqueous sodium citrate
C—40% aqueous sodium citrate
D—Butanol saturated with water
E—Dry methyl isobutyl ketone
F—A mixture of 100 parts of 80% methanol and 10.5 parts piperidine adjusted to pH 9.5 with acetic acid.
G—A mixture by volume of 80 parts methanol, 5 parts glacial acetic acid and 15 parts water.
H—Butanol saturated with water and containing 2% p-toluenesulfonic acid.
I—A mixture of 100 mls. of butanol saturated with water and 5 ml. glacial acetic acid.
J—Butanol saturated with water and containing 2% p-toluenesulfonic acid and 2% piperidine.
K—100 parts of butanol saturated with water and 2 grams p-toluenesulfonic acid plus 2 mls. piperidine plus 2 grams lauric acid.
L—A mixture of two parts isoamyl alcohol and one part chloroform, saturated with 10% aqueous sodium citrate. In this case, before applying the sample, the strips are saturated with 10% aqueous sodium citrate adjusted to pH 5.7 with citric acid and dried.

EXAMPLE 15

Solid A from Example 14 is extracted with 50 ml. of aqueous ammonium hydroxide of pH 6.4, leaving behind 220 mgms. of brown solids. Solid B (0.5 g.) from Example 14 is extracted with 30 ml. of aqueous ammonium hydroxide of pH 6.4, leaving behind 120 mgms. of solids. The basic, aqueous solutions of tetracycline are combined and passed through a chromatographic column (0.5 by 4") containing 7.5 g. Florisil (chromatographic silica). From the brown effluent there is recovered about 600 mgm. of brown solids of low activity.

The column is then eluted with 125 mls. acetone and then 125 ml. ethanol and the yellow eluates are discarded. The column is then eluted with 1% hydrochloric acid (100 mls.). The acid ethanol eluate is flashed into water (i.e., distilled in vacuo with the addition of water until all the organic solvent has been removed) and the water is neutralized with ammonium hydroxide and then lyophilized to yield solid tetracycline (lot 32) weighing 0.5 gram and having an acitivity at 1 mgm./ml. diluted 1:16 of 24 mm. (zone diameter by *B. subtilis* plate assay on agar at pH 6.2).

EXAMPLE 16

In the manner of Example 15 above, Florisil-adsorbed broth is extracted with pH 8.5 butanol and the eluate dried by azeotropic distillation. On pouring into the Skellysolve C, there is precipitated and recovered solid tetracycline (500 mgm.; lot 36) having an activity at 1 mgm./ml. diluted 1:16 of greater than 30 mm. (zone diameter by *B subtilis* plate assay on agar at pH 6.2).

EXAMPLE 17

Tetracycline of any purity is converted to the sodium salt by treating the material in water with sodium hydroxide until the pH is over 9.5. The solution is then frozen and dried under vacuum to yield the dry sodium salt in the form of a stable, water-soluble powder.

EXAMPLE 18

Streptomyces BL 456667A fermentation broth [500 ml. assaying 16.9 mm. versus S. Aureus undiluted (X) and 13.8 mm. diluted three-fold (3X)] prepared according to the above methods was adjusted with sodium hydroxide to pH 9.08 and extracted with 250 ml. n-butanol. The butanol was separated and adjusted to pH 6.90 by adding water and hydrochloric acid. The butanol was removed from this mixture by distillation in vacuo, leaving an aqueous concentrate of tetracycline, which was made up to 25 ml. by the addition of water, assaying 19.5 mm. versus S. aureus diluted three-fold, and then lyophilized to yield 115 mgm. solid tetracycline (lot 6667A-3) assaying 19.4 mm. versus S. aureus at 1 mgm./ml.

An additional 500 ml. of this broth was adjusted to pH 2.37 with phosphoric acid and extracted with 250 ml. n-butanol. The butanol was separated, adjusted to pH 6.40 with water and sodium hydroxide. The butanol was removed from this mixture by distillation in vacuo, leaving an aqueous concentrate of tetracycline which was made up to 25 ml. by the addition of water, assaying 19.1 mm. versus S. aureus when diluted three-fold, and then lyophilized to yield 356 mgm. solid tetracycline (lot 6667A-4) assaying 15.1 mm. versus S. aureus at 1 mgm./ml.

The $R_f$ spectra of these samples of tetracycline was determined as described above, using S. aureus; to be as follows:

assaying 20.0 mm. versus S. aureus when diluted three-fold, and then lyophilized to yield 331 mgm. solid tetracycline (lot 6667-2) assaying 17.3 mm. versus S. aureus at 1 mgm./ml.

The $R_f$ spectra of these samples of tetracycline was determined as described above, using S. aureus, to be as follows:

| Solvent System | A | B | C | D | E | F | 7 | 8 | G |
|---|---|---|---|---|---|---|---|---|---|
| Sample | | | | | | | | | |
| 6667-1—$R_f$ value | 6,7 | 6,7 | 4,5 | 1,2,3 | 1 | 10 | 7 | 9,10 | 8 |
| 6667-2—$R_f$ value | 6 | 6,7 | 4,5 | 2,3,4 | 1 | 10 | 7 | 9,10 | 7 |

EXAMPLE 20

The distribution coefficient of tetracycline between butanol and water (concentration in butanol divided by concentration in water) is found to be less than one at any pH but to be altered markedly by the addition of calcium ion. Thus, the distribution coefficient of tetracycline between butanol and 2.0% aqueous calcium chloride is less than 2 (and often less than 1) from pH 1 to about 6.6 but rises sharply with increasing pH and is greater than 5 from about pH 7.4 to 11, reaching a maximum of 9–10 between pH 9 and 10. A very similar pattern of tetracycline distribution coefficient versus pH is obtained using butanol and 0.5% aqueous calcium chloride, with a maximum of about 20 at about pH 10. No distribution coefficient for tetracycline greater than 1.5 is obtained between butanol and aqueous solutions containing five or ten percent sodium sulfate or two, five, or ten percent sodium chloride from pH 4 to 9. Distribution coefficients between 2 and 4 can be obtained with 2–10% NaCl only at the very acidic pH 2, which renders commercial operation difficult although not impossible.

Extraction of an aqueous solution (broth) containing at least 250 mcg./ml. tetracycline with one-quarter volume of butanol at pH 8.5 in the presence of 0.5% calcium chloride yielded a high recovery (40–50%) of

| Solvent System | A | B | C | D | E | F | 7 | 8 | G |
|---|---|---|---|---|---|---|---|---|---|
| Sample | | | | | | | | | |
| 6667A-3—$R_f$ value | 4–7 | 5,6 | 1–5 | 3,4,5 | 1 | 8,9,10 | 5,6 | 8,9,10 | 7,8,9 |
| 6667A-4—$R_f$ value | 5,6 | 5,6,7 | 3,4,5 | 4,5,6 | 1 | 8,9,10 | | 9,10 | 6–9 |

Solvent system 7 was 80% methanol containing 2% piperidine, 2% p-toluenesulfonic acid and 2% lauric acid. Solvent system 8 was pyridine containing 1% water, 1% p-toluenesulfonic acid and 1% lauric acid.

EXAMPLE 19

Streptomyces BL 456667 fermentation broth 410 ml. assaying 20.1 mm. versus S. aureus undiluted (X) and 15.0 mm. diluted three-fold (3X) prepared according to the above methods was adjusted with sodium hydroxide to pH 9.25 and extracted with 205 ml. n-butanol. The butanol was separated and adjusted to pH 7.30 by adding water and hydrochloric acid. The butanol was removed from this mixture by distillation in vacuo, leaving an aqueous concentrate of tetracycline which was made up to 21 ml. by the addition of water, assaying 18.0 mm. diluted three-fold and then lyophilized to yield 93 mgm. solid tetracycline (lot 6667-1) assaying 19.3 mm. versus S. aureus at 1 mgm./ml.

An additional 410 ml. of this broth was adjusted to pH 2.59 with phosphoric acid and extracted with 205 ml. n-butanol. The butanol was separated and adjusted to pH 6.89 with water and sodium hydroxide. The butanol was removed from this mixture by distillation in vacuo, leaving an aqueous concentrate of tetracycline which was made up to 21 ml. by the addition of water, tetracycline as solids of good potency after separation and concentration of the butanol, back-extraction into aqueous acid, such as hydrochloric, and isolation therefrom. Tetracycline is then extracted as described herein. In such a process, use is made of the calcium ion naturally present in the broth (e.g., in corn-steep liquor) as well as of added calcium ion. The calcium ion may be added as any salt, e.g., calcium chloride, calcium carbonate, and preferably use is made of a total concentration of calcium ion in the broth in the range of 0.01 to 2.0 percent. Addition of about 0.1 percent calcium chloride is a valuable procedure; the amount to be added may also be that necessary to provide in the broth the stoichiometric equivalent of the tetracycline present, as determined by assay of the broth for tetracycline and for calcium ion. Excessive amounts of calcium ion at times are not desirable as they precipitate calcium phosphates which tend to absorb tetracycline; this can be recovered but only at the expense of additional labor.

Additional information on the increased efficiency of extraction of tetracycline into butanol from fermentation broth containing calcium ion is furnished by the observation that the addition of a sequestering agent for calcium ion to a broth reduced the extraction of tetracycline into butanol below that found when no calcium chloride was added to the broth.

A tetracycline-containing fermentation broth, using corn-steep in the medium, was adjusted to pH 8.5 and divided into three equal portions to which the indicated amounts of calcium chloride were added. Extraction with butanol was increased by the added calcium ions, as shown by the following tabulated results obtained by bio-assay:

| Portion # | Percent CaCl₂ | Tetracycline present in mcg./ml. | |
|---|---|---|---|
| | | In Butanol | In Spent Broth |
| 1 | .0 | 136 | 21 |
| 2 | 0.1 | 196 | <20 |
| 3 | 0.5 | 196 | <20 |

EXAMPLE 21

To a fermentation broth containing at least 100 mcg./ml. of tetracycline there is added about 0.1% CaCl₂ and the broth is adjusted to about pH 8.5–9.0 with caustic or ammonia and then extracted with about one-fifth volume of n-butanol by multiple stage extraction. The mixture is filtered and the tetracycline-containing butanol is concentrated by distillation in vacuo with the optional addition of sufficient water at the end to permit the formation of hydrates. Tetracycline solids (at least 600 mcg./mgm.) precipitate as base or calcium salt and are collected by filtration and dissolved in minimal amounts of n-propanol. Gaseous hydrogen chloride is then passed into the n-propanol to precipitate crystalline tetracycline hydrochloride of approximately theoretical potency.

EXAMPLE 22

To a tetracycline-containing fermentation broth there is added 0.1% CaCl₂ and the broth is adjusted to about pH 8.5–9.0 with caustic, e.g. soda or potash, or ammonia and then extracted with n-butanol, using ½ volume for batchwise extraction or ¼–⅕ volume for multiple stage extraction. The mixture is filtered and the butanol phase is separated if batchwise procedure is used. The tetracycline-containing butanol is concentrated to 1/200 of the original broth volume by distillation in vacuo. The butanol concentrate and any insoluble therein are extracted with three successive equal volumes of water adjusted to pH 2.5 with hydrochloric acid. These aqueous extracts are combined, filtered and concentrated by distillation in vacuo to 1/400–1/500 broth volume. To this aqueous concentrate is added 1% calcium chloride (w/v) and the pH is adjusted to about 7.8–8.5 by the addition of ammonium hydroxide. The resulting precipitate of solid calcium tetracycline is collected by filtration and dried with an acetone wash and air or vacuum drying.

EXAMPLE 23

Tetracycline free base (one gram) is dissolved in a minimum volume of anhydrous acetone and the stoichiometric amount of hydrogen chloride required to form the salt is passed in as a gas. Solid, crystalline yellow tetracycline hydrochloride precipitates and is collected by filtration.

EXAMPLE 24

Tetracycline is purified of contaminating amounts of chlortetracycline or oxytetracycline, when such are present, by countercurrent distribution, as in the Craig apparatus, using a system of n-butanol versus 2.5% acetic acid, as described, for example, in Weisberger, Technique of Organic Chemistry, vol. III, Interscience Publ. Co., N.Y., 1950, pages 171–311, and Anal. Chem., vol. 24, pages 66–70 (1952), and vol. 23, pages 41–44 (1951).

EXAMPLE 25

Cationic, anionic and nonionic wetting agents are added to tetracycline fermentation broths to increase the efficiency of extraction of tetracycline from the broths into butanol or amyl alcohol or methyl isobutyl ketone. The pH is adjusted carefully in each case to obtain the maximum distribution into the organic solvent as determined by simple test. Examples of useful agents and concentrations are Aerosol OT (1.0%), Tween 21 (0.5%), and Tergitol (0.1%). Concentration used may be as high as 5%. Other useful agents include anionic wetting agents such as lauric acid, stearic acid, esters of sulfuric acid, naphthalene sulfonic acids, higher alkyl aromatic sulfonic acids; cationic wetting agents such as quaternary ammonium salts (e.g., $(CH_3)_3+NCH_2CONH—C_2H_4OOCR+Cl^-$

where OCR represents mixed fatty acids of coconut oil); and nonionic wetting agents such as alkyl phenol polyglycol ethers.

In one simple procedure by this method, a carrier is used to transfer the tetracycline from fermentation broth, containing at least 100 mcg./ml. of tetracycline, to methyl isobutyl ketone. This solvent is separated; the addition of gaseous hydrogen chloride precipitates solid crystalline tetracycline hydrochloride.

In another procedure by this method, tetracycline is "carried" from broth into methyl isobutyl ketone by the addition to the broth of pH 2–4 of about 0.2% of an anionic wetting agent such as Tergitol 4 (sodium tetradecyl sulfate), Tergitol 7 (sodium heptadecylsulfate) or Aerosol OT (dioctyl sodium sulfosuccinate).

EXAMPLE 26

A very simple, inexpensive and efficient method of isolating crude solid tetracycline from large volumes of fermentation broth is furnished by the following procedure. A fermentation broth containing at least 250 mcg./ml. tetracycline, and preferably 1000 mcg./ml. tetracycline, or more, is adjusted to an acid pH and the mycelium is removed by filtration. The filtered broth is then adjusted to pH 8 or higher by the addition of caustic, e.g. soda, or ammonia. Crude, active, solid tetracycline precipitates as the free base or calcium salt, contaminated with calcium phosphates and other impurities, and is collected by filtration. This crude product is further purified, if desired, by the use of procedures described above. For example, this product is then dissolved in hydrochloric acid of pH 2 containing 10% sodium chloride, extracted into butanol and the butanol is separated and concentrated by distillation in vacuo to precipitate tetracycline hydrochloride.

EXAMPLE 27

Several batches of tetracycline were prepared from *Streptomyces viridifaciens* fermentation broths in the following manner: To whole broth (150–285 gallons) there was added 285–532 g. calcium chloride and 50–120 gallons wet n-butanol. The pH of the broth, which was 4.9–5.5, was adjusted to 8.35–8.8 with 50% sodium hydroxide (4–10.5 liters). After stirring, which gave an emulsion separated by filtration using Dicalite (diatomaceous earth), the butanol phase containing tetracycline was separated (100–122 gallons) and concentrated to a volume of about 2.5–7.0 liters by distillation in vacuo at liquid temperature of less than 100° F. and under less than 35 mm. pressure.

The butanol concentrates, having pH about 7.0–7.5 were extracted three times with equal volumes of water adjusted to pH 2.0 with sulfuric or hydrochloric acid. These aqueous extracts were combined, adjusted to pH 1.5 with hydrochloric acid, slurried with one to two percent activated charcoal (e.g. Darco KB), filtered and the filtrate concentrated to about one-fifth volume by distillation in vacuo. The pH of this aqueous concentrate was then adjusted to about 6.0 with ammonium hydroxide, precipitating tetracycline which was collected by filtration. A second crop of tetracycline was frequently obtained by concentrating the filtrate again to about one-fifth volume.

The various batches of tetracycline obtained above (63 g.) were combined and dissolved in 630 ml. water adjusted to pH 1.5 with hydrochloric acid. To this solution after filtration there was added 63 g. Versene Acid (ethylenediaminetetraacetic acid). The pH was then adjusted to 6.0 with ammonium hydroxide and the tetracycline which precipitated (30 g.) was collected by filtration, dried in vacuo over $P_2O_5$ and slurried twice with 120 ml. methanol, discarding 14.5 g. insoluble material. The methanol solutions were combined and flashed into 400 ml. water. Tetracycline precipitated from this aqueous solution upon standing overnight in the cold room and was collected by filtration (8.9 g. in two crops) and air-dried.

The tetracycline was treated with carbon while in solution in water at pH 1.5; the solution was filtered and the tetracycline precipitated by raising the pH to 3.5 with ammonium hydroxide. The tetracycline (6.9 g.) was dissolved in 34.5 ml.; water adjusted to pH 1.5 with hydrochloric acid; the solution was adjusted to pH 3.5 with ammonium hydroxide and seeded; crystalline hydrated tetracycline base slowly precipitated and was collected by filtration (6.45 g.), air-dried and found to melt at about 171.5°–173.5° C., to assay 890 mcg./mgm. by ultraviolet analysis (based on 1000 mcg./mgm. tetracycline hydrochloride or 964 mcg./mgm. tetracycline trihydrate) and 892 mcg./mgm. by bio-assay versus *B. subtilis* on pH 8.0 plates and to be free of chlortetracycline and oxytetracycline or other impurities as shown by paper strip chromatography. This crystalline hydrated tetracycline base contained 19.2% moisture and was analyzed after drying.

*Analysis.*—Calculated for $C_{22}H_{24}O_8N_2$:

|   | Calculated | Found |
|---|---|---|
| C | 59.45 | 59.6 |
| H | 5.44 | 5.45 |
| N | 6.30 | 6.29 |

A suspension obtained by mulling this crystalline hydrated tetracycline free base in mineral oil (Nujol) shows many characteristic absorption bands in the infrared. Among these are the following frequencies (in reciprocal centimeters): 3490, 1672, 1607, 1524, 1259, 1222, 1130, 1065, 1040, 990, 963, 948, 932, 861, 838, 803, 786, 741, 739, and 668. The infrared absorption spectrum of this mineral oil mull within the characteristic region of wave numbers between 1350 and 650 cm.$^{-1}$ is shown in Fig. 1 of the accompanying drawings.

This crystalline hydrated tetracycline base (2 grams) was dissolved in 20 ml. n-propanol containing about 0.5 ml. concentrated hydrochloric acid. After standing thirty minutes at room temperature and ninety minutes in the cold, crystalline tetracycline hydrochloride precipitated and was collected by filtration (1.5 g.) and found to melt at 217°–219° C. with decomposition.

*Analysis.*—Calculated for $C_{22}H_{24}O_8N_2 \cdot HCl$:

|   | Calculated | Found |
|---|---|---|
| C | 54.9 | 55.0 |
| H | 5.03 | 5.2 |
| N | 5.83 | 5.99 |
| Cl | 7.37 | 7.5 |

A suspension obtained by mulling this crystalline tetracycline hydrochloride in mineral oil (Nujol) shows many characteristic absorption bands in the infrared. Among these are the following frequencies (in reciprocal centimeters): 3340, 1678, 1623, 1597, 1315, 1248, 1229, 1175, 1140, 1061, 1036, 1002, 964, 949, 864, 823, 796, 781, 743, 719, 692, and 667. The infrared absorption spectrum of this mineral oil mull within the characterisitic region of wave numbers between 1350 and 650 cm.$^{-1}$ is shown in Fig. 2 of the accompanying drawings.

Tetracycline has $[a]_D^{27}$—245° at a concentration of 1% in methanol and shows ultraviolet absorption peaks at 267 mµ ($\epsilon$, 17,400) and 355 mµ ($\epsilon$, 13,500) in 0.1 N hydrochloric acid. Tetracyline hydrochloride has $[a]_D^{27}$—253° at a concentration of 0.5% in 0.1 N hydrochloric acid.

EXAMPLE 28

Tetracycline is isolated from fermentation broths by acidifying the broth to about pH 2.0–2.5, e.g. with sulfuric acid, and filtering. The clear filtrate containing the tetracycline is then adjusted to about pH 9–10 with alkali, e.g. sodium hydroxide or ammonia. Some sodium carbonate may be added near the end to react with calcium ion present, thus precipitating calcium carbonate which adsorbs tetracycline. The tetracycline which precipitates at pH 9–10 has a potency of at least 200 mcg./mgm. and is collected by filtration and purified according to the methods described above.

As an example of such purification, this product is dissolved in aqueous nitric acid at pH 2, sodium nitrate is added and the tetracycline is extracted with n-butanol. The butanol is separated and neutralized, precipitating tetracycline base.

In another example, this product is slurried directly with n-butanol, from which pure tetracycline is recovered, e.g. as hydrochloride, upon acidification and concentration.

In a third method, this product is slurried in dilute sulfuric acid, filtered and the filtrate adjusted to about pH 6 by adding alkali, thus precipitating solid, purified tetracycline.

Either the filtered, acid broth or the alkaline filtrate from the precipitation of tetracycline from broth are suitable for use as collected or after drying as an animal feed or additive therefor. These filtrates contain large amounts of valuable food factors (e.g. proteins, carbohydrates, minerals, vitamins, and especially vitamin $B_{12}$ and congeners, unidentified stimulants for animal growth, often called animal protein factors) and may be added to animal feeds, particularly those of vegetable origin, either before or after concentration or drying. The value of such animal feeds and additives from these filtrates is increased by the addition to the medium before fermentation of a soluble cobalt salt, e.g. about 0.1 to 20 parts per million of the nutrient medium of cobalt nitrate, and by the addition to the medium before fermentation of a substance (such as an alkali metal cyanide or an alkali metal ferrocyanide or ferricyanide) furnishing a source of cyanide ion in an amount within the range of about 0.1 to 100 parts per million.

EXAMPLE 29

An effective method of obtaining crystalline tetracycline from fermentation broths is furnished by the following procedure. Broth is acidified to about pH 2.0–2.5, e.g. with sulfuric acid, filtered and the solids are discarded. The filtrate is adjusted to an alkaline pH, e.g. about 9.0–9.5, and extracted with one-third volume of n-butanol. The butanol is separated, discarding the aqueous phase (spent broth), acidified with sulfuric acid, e.g. to pH 5–6, and concentrated by distillation in vacuo to about one-fiftieth of the original broth volume. The tetracycline which precipitates is collected by filtration and found to have a potency of at least 200 mcg./mgm. The butanol is recycled. The crude tetracycline (100 g.) is dissolved in one liter of water acidified to about pH 1.5 with sulfuric acid; insoluble matter is removed by filtration and discarded. The aqueous solution is treated with activated carbon (10–50 g.) and filtered. At this point it is optional to add about 10 g. Sequestrene (ethylenediamine-tetraacetic acid) or another agent to sequester calcium. The pH of this aqueous solution is then adjusted to about 3.5, e.g. with ammonia, and on standing pure tetracycline base crystallizes out and is collected by filtration.

Additional less pure tetracycline suitable for re-cycling is precipitated from the final filtrate by raising the pH to about 6.

Sequestering agents useful for removing calcium and thus facilitating precipitation of pure tetracycline base include citric acid, tartaric acid, sodium phytate, gluconic acid, phosphates such as sodium metaphosphate and in general the members of this class known to the art, e.g. see J. Chem. Educ. 25, 482–488 (1948) and references therein. Many of these agents are weakly ionized, polybasic acid compounds or hydroxylated, organic carboxylic acids.

EXAMPLE 30

An effective and simple method of isolating tetracycline from fermentation broths without the use of large volumes of solvents for extraction is furnished by the following procedure. The broth is adjusted to pH 9–10 by the addition of alkali and filtered. Less than 100 mcg./ml. tetracycline remains dissolved in the filtrate, which is discarded. This mixture with mat (mycelium) of adsorbed and precipitated tetracycline and other broth constituents is suitable for use as collected or after drying as an animal feed or additive therefor. The filtrate, which contains little tetracycline but large amounts of valuable food factors (e.g. proteins, carbohydrates, minerals, vitamins and especially vitamin $B_{12}$ and congeners, unidentified stimulants for animal growth, often called animal protein factors) may also be added to animal feeds, particularly those of vegetable origin, either before or after concentration or drying. The value of such animal feeds and additives from both precipitate and filtrate is increased by the addition to the medium before fermentation of a soluble cobalt salt, e.g. about 0.1 to 20 parts per million of the nutrient medium of cobalt nitrate, and of a substance (such as an alkali metal cyanide or an alkali metal ferrocyanide or ferricyanide) furnishing a source of cyanide ion in an amount within the range of about 0.1 to 100 parts per million.

The solid mat and adsorbed tetracycline is extracted at low pH (e.g. 1.5) with small volumes of aqueous acid, e.g. sulfuric acid, oxalic acid, to give a solution containing at least 3000 mcg./ml. tetracycline.

In one method the tetracycline is isolated by neutralizing this acid solution to pH 4–10, and preferably at least pH 6, thus precipitating solid tetracycline, in base or calcium form, of a potency of at least 100 mcg./mgm.

In another method, the tetracycline is isolated by neutralizing this acid solution to pH 9–10 and extracting the tetracycline with about one-third volume of n-butanol. The butanol is separated and concentrated to about one-twentieth volume, precipitating tetracycline, in base or calcium form, of a potency of at least 200 mcg./mgm.

EXAMPLE 31

Crude damp tetracycline base (e.g. 1 g., 20% water) is conveniently converted to crystalline hydrochloride by dissolving the base in a minimum amount of dry n-butanol (e. g. 5 ml.) by the addition of concentrated hydrochloric acid (e.g. 0.3 ml.), filtering and decolorizing with carbon if desired, and then adding an additional amount of dry butanol (e. g. 5 ml.). Pure tetracycline hydrochloride crystallizes out on standing and is collected by filtration. The first filtration may be omitted; in that case all the butanol is added at once and the tetracycline dissolves and then crystallizes out spontaneously as tetracycline hydrochloride.

EXAMPLE 32

Tetracycline is purified of contaminating amounts of chlortetracycline, when present, by slurrying the free base in methanol. The chlortetracycline base does not dissolve; the dissolved tetracycline base is recovered in purified form as above, e.g. by evaporation of the solvent or by pouring the methanol into water.

EXAMPLE 33

Tetracycline is efficiently purified of contaminating amounts of chlortetracycline, when such are present, by slurrying in aqueous acid of substantially pH 2.5, which dissolves only the chlortetracycline. The preferred acid is hydrochloric acid; other acids, e.g. sulfuric acid, phosphoric acid, may be used, however, provided the requisite pH is obtained. Tetracycline base or salt is slurried in hydrochloric acid sufficient to provide a pH of 2.5 or, as is preferred, impure tetracycline base or salt, e.g. hydrochloride, is dissolved in aqueous acid at pH 1.5 or less and sufficient base, e.g. ammonium hydroxide, sodium hydroxide, is added to provide a pH of 2.5. The amount of tetracycline used is not a limiting factor; in general it is convenient to use 50 to 100 mgm. tetracycline base or salt per milliliter of water acidified to pH 2.5 with hydrochloric acid. The pH is a critical factor; substantially pH 2.5 is preferred although any pH in the range 2.0–3.5 is useful. The amount of chlortetracycline present as an impurity in tetracycline to be purified by this procedure, should not exceed 9 mgm./ml. of acidified water and preferably should be less than 5 mgm./ml.; this limit is easily observed by increasing when necessary the amount of acid water used for slurrying. Such solids, e.g. tetracycline hydrochloride and chlortetracycline hydrochloride, in this purification are thus mixed, i.e., slurried, in water acidified with hydrochloric acid to substantially pH 2.5 for a considerable period of time, e.g. sixteen hours, sufficient to permit the chlortetracycline to dissolve. This is determined by simple test. The purified, solid tetracycline base which remains undissolved is then collected by filtration.

Thus, tetracycline hydrochloride (10 g.) assaying 830 mcg./mgm. tetracycline and 171 mcg./mgm. chlortetracycline (83% tetracycline) by the differential ultraviolet absorption method and containing about 10% chlortetracycline as determined by paper-strip chromatography, was slurried for sixteen hours in 200 ml. water adjusted to about pH 2.5 with hydrochloric acid. The solid, purified tetracycline base was then collected by filtration, dried, found to weigh 8.0 grams, to assay 901 mcg./mgm. tetracycline and 39 mcg./mgm. chlortetracycline (96% tetracycline) by the differential ultraviolet absorption method and to contain 95–97% tetracycline as determined by paper-strip chromatography. The recovery of tetracycline was 87%.

A similar experiment conducted under nitrogen gave a 92% recovery of tetracycline base containing from zero to three percent chlortetracycline, potency 929 mcg./mgm.

EXAMPLE 34

Tetracycline is efficiently purified of contaminating amounts of chlortetracycline, when such are present, by slurrying in aqueous alkali of about pH 7.5–9.0, which dissolves only the chlortetracycline. In another embodiment, the base or acid addition salt is dissolved at pH 9.5 and precipitated as purified tetracycline base by adjusting the pH to 7.5–9.0, preferably about 8.5, by the addition of acid, e.g. hydrochloric acid. The preferred alkali is ammonia but other water soluble alkalies, such as sodium hydroxide or triethylamine, are useful provided that they furnish the requisite pH. Tetracycline base or acid addition salt, e.g. hydrochloride, is slurried in water adjusted to about pH 8.5–9.0 by the addition of alkali. The amount of tetracycline is not a limiting factor; in general it is convenient to use 50 to 100 mgm. per ml. water. The pH is a critical factor and must be substantially pH 7.5–9.0. The amount of chlortetracycline, present as an impurity in the tetracycline to be purified by this procedure, should not exceed 12 mgm./ml. of alkaline water and preferably should be less than 2 mgm./ml.; this limit is easily observed by increasing when necessary the amount of alkaline water used for slurrying. Such solids, e.g. tetracycline and chlortetracycline, in this purification are thus mixed, i.e. slurried, in water made alkaline with ammonium hydroxide to substantially pH 8.5–9.0 for a considerable period of time, e.g. sixteen hours, sufficient to permit the chlortetracycline to dissolve. This is determined by simple test. The purified, solid tetracycline base which remains undissolved is then collected by filtration. The entire operation is preferably conducted in an oxygen-free atmosphere, e.g. under nitrogen, to minimize or eliminate decomposition.

Thus, tetracycline hydrochloride (10 g.) assaying 945 mcg./mgm. tetracycline and 171 mcg./mgm. chlortetracycline (85% tetracycline) by the differential ultraviolet absorption method and containing about 10% chlortetracycline as determined by paper-strip chromatography, was slurried under nitrogen for sixteen hours in 200 ml. water adjusted to pH 9.0 with ammonium hydroxide. The solid, purified tetracycline base was then collected by filtration, dried, found to weigh 8.5 g., to assay 986 mcg./mgm. tetracycline and 20 mcg./mgm. chlortetracycline (98.1% tetracycline) by the differential ultraviolet absorption method and to contain 97–98% tetracycline as determined by paper-strip chromatography. The recovery of tetracycline was 89%.

All assays refer to equivalent micrograms of tetracycline hydrochloride. Thus, the theoretical maximum potencies in mcg./mgm. for anhydrous solids are tetracycline hydrochloride 1000 and tetracycline base 1080.

EXAMPLE 35

Calcium tetracycline is purified by extracting with methanol in which it is insoluble, and then dissolving in methanol containing calcium chloride. Undissolved impurities are removed by filtration and water and ammonia to pH 8 are added to the solution to precipitate purified calcium tetracycline.

EXAMPLE 36

Tetracycline of any purity may be converted to the hydrochloride by treating the material in water with hydrochloric acid until a clear solution is obtained and the pH is below 3–4. The solution is frozen and dried under vacuum to give a readily soluble powder.

EXAMPLE 37

10.0 grams (0.0225 mole) of anhydrous tetracycline was suspended in 100 ml. of n-propanol and 1.1 grams (0.0244 mole) of 98% formic acid was added. When the mixture was heated at 50–55° for a few minutes and cooled, a copious crystalline precipitate appeared. After standing for 15 hours at 0–5° C., the mixture was filtered and the crystalline yellow solid tetracycline formate was washed in turn with n-propanol and anhydrous ether. It was air-dried. Weight—9.8 g. (89%). M.P.—176.5°–177° C. (sinters at 173°).

*Analysis.*—Calculated for $C_{22}H_{24}N_2O_8 \cdot HCOOH$:

|   | Calculated | Found |
|---|---|---|
| C | 56.3 | 56.6 |
| H | 5.35 | 5.59 |

$H_2O$, none lost at 60° C. in vacuo.

The Omegamycin of the present invention has been found to be the same substance which is now commonly designated tetracycline, whose properties are described in the Journal of the American Chemical Society, volume 75, pages 4621–23, 1953.

Thus, a sample of tetracycline free base was prepared according to the literature from chlortetracycline and found to melt at 170°–175° C. and to contain 0.71 percent chlorine, indicating a contamination with about 10 percent unreacted chlortetracycline. This sample and another, chlorine-free sample of pure tetracycline (of M.P. 169°–171° C. with decomposition) were shown to be the same as a sample of Omegamycin (lot 30; prepared according to Example 14 above) and all impurities were distinguished, by examination of these samples and samples of chlortetracycline and oxytetracycline, both alone and as mixtures, by paper strip chromatography (particularly using solvent systems D and L).

That Omegamycin (lot 30) is tetracycline was also shown by a finding of identical rate of loss of activity in pH 8.0 buffer at 37° C. at about 0.7 mgm./ml. (28% loss in 48 hours); chlortetracycline lost about 50% of its activity in 14 hours and oxytetracycline lost about 50% of its activity in 26 hours under the same conditions.

In addition, Omegamycin is clearly differentiated from chlortetracycline and oxytetracycline by assay on pH 8.0 agar, on which chlortetracycline and oxytetracycline appear much less active than Omegomycin.

Assays of solids were performed on *B. subtilis* plates with agar pH 6.2 and pH 8.0 and using buffers described above, as diluent, corresponding to the agar pH. The results of typical runs follow:

| Antibiotic | Concentration put in cylinder, mcg./ml. | *B. subtilis* Plate Assay Zone size, mm. | |
|---|---|---|---|
| | | (pH 6.2) | (pH 8.0) |
| Chlortetracycline | 0.5 | 19 | NR |
| | 2 | 20.2 | NR |
| Oxytetracycline | 4 | 15.5 | NR |
| Tetracycline | 50 | 21.5 | 19.0 |
| Chlortetracycline plus | 1 | 21.5 | 18.2 |
| Tetracycline | 50 | | |
| Omegamycin (lot 25) | 100 | 20.2 | 16.6 |
| Omegamycin (lot 30) | 25 | 23.3 | 15.1 |
| | 12.5 | 20.8 | 12.9 |
| Omegamycin (lot 36) | 16 | 25.9 | 10.2 |

Tetracycline may thus be purified of contaminating amounts of chlortetracycline or oxytetracycline by maintaining an aqueous solution at about pH 8.0 until all the chlortetracycline or oxytetracycline is decomposed and then isolating purified tetracycline, as above.

Thus, solid tetracycline base containing about 26% chlortetracycline was dissolved in aqueous sodium hydroxide and additional sodium hydroxide was added to raise the concentration to 0.17–1.17 Normal. After standing at room temperature or 40° C. for 6, 20, or 45 minutes, the solution was acidified to pH 1.5–2.0, filtered and the tetracycline precipitated and recovered by raising the pH of the filtrate to 3.5 or 6.0. The recovered tetracycline was of good potency and contained less than two percent chlortetracycline.

In an additional case about 45,000 mcg./ml. of crude tetracycline was freed of contaminating chlortetracycline by solution for 24 hours at pH 8.5 at room temperature and subsequent recovery.

The tetracycline (Omegamycin) of the present invention is useful as the free base, including its anhydrous and hydrated forms and particularly the trihydrate, in combating many diseases caused by bacterial infection in man and animals. For this use, tetracycline is associated with a significant amount of a pharmaceutically acceptable carrier which may be either a solid material or a liquid. The compositions may take the form of tablets, effervescent tablets, powder, granules, capsules (both hard and soft shell capsules), or suspensions in edible oils, or other dosage forms which are particularly useful for oral ingestion. Liquid diluents are employed in sterile conditions for parenteral use, that is, by injection. Such a medium may be a sterile solvent or suspending agent such as water or an injectable oil. The compositions may take the form of active material, namely tetracycline (which is used in this discussion to refer to the free base or hydrates thereof), admixed with solid diluents and/or tabletting adjuvants such as cornstarch, lactose, talc, stearic acid, magnesium stearate, gums or the like. Any of the encapsulating or tabletting materials used in pharmaceutical practice may be employed where there is no incompatibility with the tetracycline. The materials may be tabletted with or without adjuvants. Alternatively, the tetracycline may be placed in the usual capsule or resorbable material such as the usual gelatin capsule and administered in that form. In yet another embodiment, tetracycline may be put up in powder packets and so employed. Tetracycline may be prepared in the form of a palatable suspension in which the tetracycline is not soluble, e.g., coconut oil. In this case, use may be made of coconut oil modified to have a setting point below 60° F. and/or gelled with an aluminum stearate. Such a suspension may be given orally as made or may be encapsulated. Tetracycline ointments and lotions are useful topically; use for topical therapy is made of nose drops, troches, and suppositories. The tetracycline of the present invention is particularly useful when given by the oral or intramuscular routes; a useful dosage range in man is about 10–1000 mgms. per dose. Dosages are given about one to six times per day, depending on the patient, the infection, the route of administration and the like.

The percentage of active ingredients in these compositions may be varied. It is necessary that the active ingredients constitute a proportion such that a suitable dosage will be obtained. Obviously, several unit dosage forms may be administered at about the same time. Although it is found, particularly on intravenous injection; that a percentage of less than 0.10 percent of tetracycline is effective, it is preferable to use not less than 0.10 percent of tetracycline. Activity increases with the concentration of tetracycline. The percentage of active agent may be 10 percent, or 25 percent, or even a higher proportion of the substance administered. For example, tablets may be prepared with a minor proportion of diluent and a major proportion of active material. Tablets containing from about 10 to 1000 mgms. of tetracycline are particularly useful. The solid pharmaceutical carrier used may be an envelope enclosing pure tetracycline, e.g. pure tetracycline trihydrate in a gelatin capsule.

The solubility of tetracycline in water between pH 5 and 7 is very low (approximately 0.4 mgm./ml.). The addition of calcium chloride, e.g., 1% w./v., enables much more concentrated solutions to be obtained having a solubility greater than 5 mgm./ml., e.g. at pH 6 or in the range of pH 5–7. These solutions are highly viscous, although the viscosity may be altered by pH adjustment within the range of high solubility. Stable solutions or suspensions with higher tetracycline content are thus readily obtained which are of value in pharmaceutical formulations.

Highly concentrated aqueous solutions of tetracycline in excess of 20 mgm./ml. at pH 3.5–9 suitable for oral and parenteral use are obtained by mixing tetracycline, a nontoxic heavy metal salt, e.g. aluminum sulfate, and tartaric acid or similar sequestering agents such as citric acid, ethylenediamine-tetra-acetic acid, pluconic acid and phytic acid. By heavy metal is meant any metal other than the alkali metals; thus alkaline earth metals such as calcium are included within the present definition of heavy metals. A similar composition of like utility and solubility is prepared by mixing a sequestering agent and a heavy metal salt of tetracycline.

While various embodiments of the invention have been described in some detail, it will be understood that various modifications may be made in the procedures described and the products disclosed without departing from the scope of the invention. Certain agents, compounds, or mixtures (e.g. acids, media, solvents, and the like) and other details described in relation to one example or description of procedure may be employed in connection with other examples or procedures.

We claim:

1. A process for recovering tetracycline from a fermentation broth comprising the consecutive steps of adjusting the pH of an acidic fermentation broth to a pH in the range of 8.5 to 9.4 inclusive, extracting the tetracycline with n-butanol, separating the n-butanol and recovering the tetracycline therefrom.

2. A process for recovering tetracycline from a fermentation broth comprising the consecutive steps of adjusting the pH of an acidic fermentation broth to a pH in the range of about 8.5 to 9.0, inclusive, extracting the tetracycline with n-butanol, separating the n-butanol and recovering the tetracycline therefrom, said broth at the time of n-butanol extraction containing about 0.1 percent of calcium chloride added after the end of fermentation.

References Cited in the file of this patent

UNITED STATES PATENTS

| | | |
|---|---|---|
| 2,482,055 | Duggar | Sept. 13, 1949 |
| 2,516,080 | Sobin | July 18, 1950 |
| 2,586,766 | Pidacks | Feb. 19, 1952 |
| 2,609,329 | Niedercorn | Sept. 2, 1952 |
| 2,640,842 | Weidenheimer | June 2, 1953 |
| 2,655,535 | Pidacks | Oct. 13, 1953 |
| 2,656,347 | Goett | Oct. 20, 1953 |
| 2,658,078 | Blase | Nov. 3, 1953 |
| 2,699,054 | Conover | Jan. 11, 1955 |
| 2,734,018 | Minieri | Feb. 7, 1956 |
| 2,739,924 | Lein et al. | Mar. 27, 1956 |
| 2,804,476 | Bogert | Aug. 27, 1957 |

FOREIGN PATENTS

| | | |
|---|---|---|
| 506,950 | Belgium | Nov. 30, 1951 |
| 497,345 | Canada | Nov. 3, 1953 |

OTHER REFERENCES

Weidenheimer: Abstract of Serial No. 83,780, 650 O.G. 895, Sept. 18, 1951.

Van Dyck et al.: Antibiotics and Chemotherapy, vol. 2, April 1952, pp. 184–198.

Antibiotics and Chemotherapy, vol. 4, pp. 375–379; 750–752.

Martin: Antibiotics Annual, 1954–1955 (Abstract 156), pp. 1020–1024.

Ann., N.U. Acad. Sci., 60, Art. 1, pp. 86–95.

Baldacci. Archiv. fur Mikrobiologie, "Classification of the Actinomyces Species," vol. 20, No. 4 (1954), pp. 347–357.